(12) United States Patent
Navaro

(10) Patent No.: US 7,827,525 B1
(45) Date of Patent: Nov. 2, 2010

(54) DATA OBJECT UTILIZATION IN SOFTWARE APPLICATIONS

(76) Inventor: Richard Paul Navaro, 5160 Waterloo Rd., Burlington, KY (US) 41005

( * ) Notice: Subject to any disclaimer, the term of this patent is extended or adjusted under 35 U.S.C. 154(b) by 1096 days.

(21) Appl. No.: 11/421,959

(22) Filed: Jun. 2, 2006

(51) Int. Cl.
*G06F 9/44* (2006.01)
*G06F 9/45* (2006.01)

(52) U.S. Cl. .................. 717/108; 717/103; 717/116; 717/151; 717/165

(58) Field of Classification Search .............. None
See application file for complete search history.

(56) References Cited

U.S. PATENT DOCUMENTS

| | | | | |
|---|---|---|---|---|
| 5,960,438 | A * | 9/1999 | Chang et al. | 707/103 R |
| 6,338,068 | B1 * | 1/2002 | Moore et al. | 707/102 |
| 6,529,914 | B1 * | 3/2003 | Doan et al. | 707/103 Y |
| 6,985,912 | B2 * | 1/2006 | Mullins et al. | 707/103 R |
| 7,111,005 | B1 * | 9/2006 | Wessman | 707/9 |
| 7,424,493 | B2 * | 9/2008 | Gupta | 707/201 |
| 2002/0147743 | A1 * | 10/2002 | Le et al. | 707/505 |
| 2003/0182307 | A1 * | 9/2003 | Chen et al. | 707/103 X |
| 2005/0149907 | A1 * | 7/2005 | Seitz et al. | 717/108 |
| 2005/0154765 | A1 * | 7/2005 | Seitz et al. | 707/104.1 |

* cited by examiner

*Primary Examiner*—Tuan Q Dam
*Assistant Examiner*—Isaac T Tecklu
(74) *Attorney, Agent, or Firm*—Wood, Herron & Evans, LLP

(57) ABSTRACT

A data embodying object is programmed in accordance with object oriented techniques, and implements data retrieval methods without access to an external database, but rather using code in the object that includes immediate values which themselves embody the data to be retrieved in response to an invocation of the method. As a consequence, the data retrieval method is executed without external access to a DASD or other external data source and without the resulting delays or unavailabilities. The data-embodying object takes the form of a class, and can have one or more methods returning data. The class is automatically generated and can be compiled into its own library file, or added to an existing project and compiled into the executable file. Like a typical class and source code, the code and data of an object can be obfuscated, and/or the data encrypted, and afforded all the other protections available to program source code.

23 Claims, 1 Drawing Sheet

DATA OBJECT UTILIZATION IN SOFTWARE APPLICATIONS

FIELD OF THE INVENTION

The present invention relates to software that utilizes and manages databases of information.

BACKGROUND OF THE INVENTION

Software applications are typically created using and relying upon an application development environment, such as Microsoft's .NET environment, Sun Microsystem's Java environment, and others. These development environments provide libraries and structures for creating richly customized programs for particular applications. By using existing, general purpose environments and tools, the development of complex and feature-rich software can be streamlined.

Software may be developed for general purpose use, as exemplified by word processing programs, spreadsheet programs, presentation software, and the like. Software may also be developed to model the information flow in a specific business. Software that is specialized for a business is often referred to as "enterprise software". Enterprise software is distinguishable from general purpose applications such as word processors, spreadsheets, or other such applications, in that enterprise software seeks to specifically model the information generated and managed by a particular type of business, to make the flow of that information more efficient and to reduce the training required to obtain best utilization of human resources.

Applications typically provide customized screen controls and dialogs, to present information of particular relevance to a particular application. These controls access data relevant to a business process, and present that data for review, editing and reporting in a manner that matches the information flow for the business.

Data utilized by software comes in a number of categories, but is all handled in a relatively similar, modular fashion, consistent with the application development environment. For example, software may manage a unique catalog of products or services and their pricing, a unique set of vendors and business partners, unique office locations, unique employee information, and, of course, unique customer information and transactions, accounting and billing records. During application development, each of these data categories is incorporated into an overall data model or database schema, and that data model is then implemented in an underlying database application, as a collection of tables for each type of data, with the table populated by records representing each unique data item. For example, one table might identify partners, and include columns that identify, for each partner, the name, address, telephone and main contact information for the partner. A second table might identify customers and have similar information for each customer. These tables may link to each other in various ways, such as by the use of a common postal (zip) code table associating postal codes with names of associated cities, towns or geographic areas.

It will be understood that the use of tables of data coupled to software functions is common practice in enterprise software where a business typically creates and consumes specialized data as part of its day-to-day operation. However, tables of data are also utilized in general purpose software. For example, a general purpose word processor or spreadsheet program may provide a zip/postal code lookup function that is driven by a table of zip/postal code data.

Typical modern programming practice utilizes an object oriented methodology, in which an executing application is treated as a dynamic set of interacting objects. Objects are typically associated with data and methods that access that data in predefined ways. Most objects typically permit access to their data members only through their defined methods. This is useful in that it ensures that the data will remain in a well-defined state as defined by the methods. Thus, in a program consistent with the example described above, an object may be created for handling partner information, and include within that object a method for accessing partner name, address and contact information. A second object may be created for handling invoice information, and include objects for accessing an invoice, editing an invoice, changing an invoice status, and the like. The variety of methods provided for particular data in an object may vary based upon the business practice; thus, methods for modifying invoices may be provided because such modifications are done frequently in normal business practice, whereas methods to modify vendor or partner information may not be provided, since such modifications are rare and can be better accomplished directly with a database program by a system administrator.

As an example, referring to FIG. 1, to construct a screen control 10 on a display screen 12, such as a control that presents partner information to a user (e.g., so that the user may associate a partner with a particular transaction), program execution passes from a main executable 14 to an object 16 that creates the control, which then passes a query request message 18 to an object 20 managing the partner information. The partner information object 20 then performs a query by passing a query message 22 to a database server 24 which performs the required query upon a database 26. The result of the query executed upon the database is, e.g., an array 28 of partner information including the name, address and contact information for all partners in the database. Array 28 is returned via object 20 to object 16 which utilizes the array to populate the control 10.

The modularity apparent in the above example, affords advantages. Specifically, routines that are not always used by a program, such as code for objects 16 and 20 in the above example, may be moved to libraries, which are collections of "helper" code and data, which provide services to independent programs. Libraries were originally popularized as a way for an operating system (OS) such as Microsoft's Windows operating system to provide system services, with the initial purpose of saving both disk space and memory required for applications. Any code which many applications share could be separated into a library which only exists as a single disk file and a single instance in memory. Extensive use of libraries allowed early versions of Windows to work under tight memory conditions.

Libraries are also useful in that they permit code and data to be shared and changed in a modular fashion. To explain, the use of libraries needs to be elaborated.

Executables and libraries make references known as links to each other through the process known as linking, which is typically done by a linker. These links are typically dynamic, which means that a library is not copied into an executable program, or another library, at compile time, but instead the library remains in a separate file on disk. Only a minimal amount of work is done at compile time by the linker—it only records what libraries the executable needs and the index names or numbers. The majority of the work of linking is done at the time the application is loaded (loadtime) or during the execution of the process (runtime). The necessary linking code, called a loader, is part of the underlying operating system. At the appropriate time (when a library object is needed) the loader finds the relevant libraries on disk and adds the relevant data from the libraries to the process's memory space.

A library that is loaded only when needed, is called a dynamically linked library. This term is sometimes shortened to "dynamic link library" or DLL in Microsoft Windows environments, although when used in this application the term "library" refers to any dynamically loaded component of a program, and includes, among others, Windows DLL files and Java JAR files. A DLL, is a collection of routines that can be called by applications and by other DLLs. DLLs contain shareable code or resources, and they provide the ability for multiple applications to share a single copy of a routine they have in common. A DLL library contains a table of all the objects and supported methods within it, known as entry points. Calls into the library "jump through" this table, looking up the location of the code in memory, then calling it.

Some DLL's are referenced and linked into a program at compile time. The executable thus has all the information it needs to load the DLL. This speeds up loading, but the DLL cannot change after compilation or the application will not run. In contrast, there are DLL's that are not linked at compile time, but defined and loaded at runtime. These DLL's can change content and still be loaded.

Because dynamically linked libraries are linked only when used, they allow changes to be made to code within the self-contained library, with the resulting change seamlessly shared by potentially several applications, without any change to the applications themselves. This basic form of modularity allows for relatively compact patches and service packs for large applications, such as Microsoft Office, Microsoft Visual Studio, and even Microsoft Windows itself.

However, libraries, and Microsoft-type DLLs in particular, also have drawbacks: DLL conflicts may occur when several applications use the same DLL library but conflict as to which version is to be used. In older versions of Microsoft Windows, programs and dll's needed to be registered and usually stored in a common location. As a consequence, there were problems in older versions of Microsoft Windows when one copy of a dll was overwritten by a different file with the same name, as well as registry conflict problems.

Recently, Microsoft's .NET programming environment introduced dll's which do not need to be registered, and can be copied directly into the program folder or the Global Assembly Cache (GAC), where they are uniquely identified, and multiple copies can coexist. Microsoft's .NET framework uniquely names and associates DLL's with the associated executable, with the intention of allowing side-by-side coexistence of different versions of what may be the same shared library. This compromises disk space for operability, which is reasonable with the easing of disk space restrictions in modern computer systems.

In the context of database-using applications, libraries are often used to separate code for infrequently used objects and methods from code that is used in typically every execution of the application. Thus, for example, if the lookup of a partner name and contact information is relatively rare, good programming practice might be to separate the code for that lookup, i.e., the code of objects 16 and 20, into libraries, which are dynamically loaded when the user requests such a lookup. This approach has the advantage of saving memory space for other uses until needed, and furthermore allows modular updating if, for example, the format of the database storing particular information changes, requiring an update of the executable, since in that case the upgrade may be handled by the mere installation of a replacement library (e.g. DLL file) rather than a reinstallation of a larger executable program.

Although the modularity provided by libraries and object oriented programming offers these numerous advantages in operability and upgradability, there are drawbacks in performance. Primarily, the repeated indirection involved in obtaining data can be time consuming and disturbing to a user. That is, referencing the example above, to build screen control 10 including partner contact information, the system must first locate the library files for objects 16 and 20, link and load them, and then use the embedded methods in those objects to execute a query onto a database server 24, after which the resulting data is packaged as a returned result and delivered to the object generating the screen control.

The delays in this process come in several parts, but are greatest at those points in the process that involve access to a dynamically allocatable storage device (DASD) such as a hard disk drive, which will occur whenever data must be obtained outside of the processor's available memory, such as when locating and installing a library, and when performing the subsequent database query.

Databases, due to their size, are typically stored outside of local memory of the processor that executes the software application. Indeed, in a multi-user environment, to implement sharing of data, that data is often not local to the computer executing the application, but rather is remotely accessed, such as from a DASD at a central location such as a local or remote database server. As a result, database query access often involves the remote access of a large data file on a DASD over a network or the Internet. If the server is accessed through the Internet, the Internet connection speed is a slowing factor, as well as the fact that, typically, the data will have to go through one or more encrypting and decrypting processes. Also, if a remote server is being used, the application can only run when the remote server is accessible. Thus, applications using remote data face challenges and far greater potential delay in building a screen control of an application.

The delays inherent in a large database cannot be readily avoided in many situations, for the reason that some of the data stored in an application's database may be large, such as detailed customer purchase records, invoicing, and the like, which provide necessary and highly specific details about the operations of a business. However, some aspects of the database may be far smaller in size (but no less critical to the operation of the enterprise program), such as a list of vendors or partners, or a zip/postal code lookup table, but those are a small fraction of the information typically held in a database.

It is possible to optimize the indexing and structure of a database to increase the speed with which data is accessed, albeit often by compromising in favor of one type of access pattern over others. A great deal of time and energy has been devoted to the optimization of database applications to improve their performance. However, while these approaches have offered efficiencies, there remain substantial performance gaps in the performance of applications, particularly in those portions which utilize unusual database queries for which database performance is not optimized.

More recently, in some applications data has been stored in an XML (eXtensible Markup Language) file, a method that differs in a number of ways from the use of databases and objects to access them. Specifically, XML files are flat data, marked with predefined tags according to open and standard rules. Functionality (methods) for data lookup need to be separately coded from the XML file and designed to access the tags and the utilize the tags to access the corresponding data. (The presence of the tags may increase the size and loading time of the XML as compared to an equivalent database file.) XML files are often unencrypted and thus easily accessed outside of the application, and would need to be encrypted to prevent such outside access, whereas protections from such accesses is normally provided in the security of a database and the inherent encryption of code for accessing the database.

SUMMARY OF THE INVENTION

The present invention improves upon the performance achieved by the prior art in the retrieval of data in object-oriented programming, by providing a unique construct known as a data embodying object. The data embodying object is programmed in accordance with object oriented techniques, namely, it is associated with data and incorporates methods which may be executed in response to externally originated messages. However, the implementation of a data retrieval method by a data embodying object does not involve access to an external database, but rather is implemented within the code of the object by a series of statements containing immediate values which themselves embody the data to be retrieved in response to an invocation of the method. As a consequence, the data retrieval method is executed without external access to a DASD or other external data source and without the resulting delays.

In particular embodiments, a data-embodying object takes the form of a class, and can have one or more methods returning data. The class is automatically generated and can be compiled into its own library file, or added to an existing project and compiled into the executable file. The data written into the class is a snapshot of data retrieved from an existing database or data store. During creation of the class, the data will be retrieved from a database, but it could be read from another file, such as a spreadsheet file, text file, local database file, or data accessed via a network service call. The data in the class is persistent and immutable. It does not exist solely in memory or need to be re-loaded from another source. The data is part of the class structure. Advantageously, this means the application execution need not wait for the remote source and may proceed even if the remote source is unavailable.

Like a typical class and source code, the present invention permits the code and data of an object to be obfuscated if desired, and afforded all the other protections available to program source code. Alternatively, or in addition, the data may be encrypted when stored within the data embodying object, and may be decrypted by the object when returned, or may be returned in an encrypted form. Furthermore, restrictions on access can be handled, thereby allowing confidential data to be included in data-embodying objects. However, unlike typical object-oriented programming structures for data access, data stored in a data-embodying object in accordance with principles of the present invention is immediately available to the program without an external database call. By eliminating database calls, CPU, space and bandwidth requirements of the server may be reduced. Furthermore, by making data available to the client locally, as part of a library code, the client can be afforded functionality offline.

The methods in the libraries can be custom designed for a particular software package, so they can return the data in any way the program requires.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Principles of the present invention envision a library file containing classes and methods whose state (data) is largely retrieved from an existing data store (database) at time of creation. Unlike regular classes, the code for the object classes created in accordance with principles of the present invention contain an extensive number of immediate value statements embodying the data store at the time the code is created. This code need not be written by hand but rather is automatically generated from a code writing method.

Library files created in accordance with principles of the present invention can be of various types (dll's for window programs, jar's for java). The library files can be compiled with the program (which is most appropriate if the data is static) or linked to the program at runtime (appropriate if the data will need to be updated).

An object formed in accordance with principles of the present invention is a hybrid between a conventional class and a conventional database, sharing characteristics of both. While a typical class has metadata and structure for data, it usually has very little if any data. A class in accordance with principles of the present invention is similar in some respects, but differs in that it is predominately data. Indeed, like a database, a class in accordance with principles of the present invention can contain large amounts of raw data and through its methods, can be queried to return all or a subset of that data. Also, like a database, a class in accordance with the invention can hold both the data schema and the data, so that the data can be re-organized into an organized structure. However, in a typical database, the database access is achieved by a separate program, and access to the data is controlled by the database program. Unlike a database, a class in accordance with principles of the present invention is linked into the program methods that access it, and furthermore, access to the data is controlled by the calling program.

Figure 2:
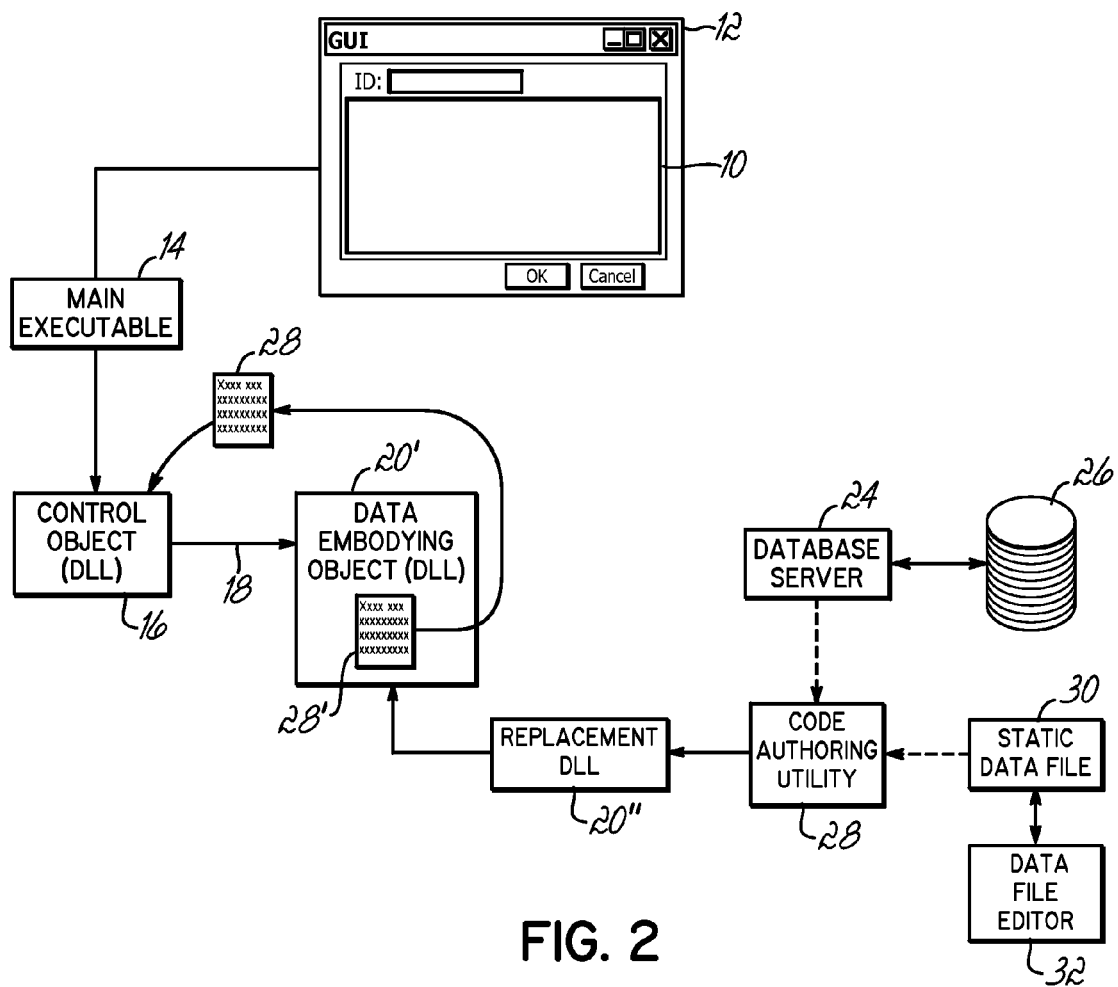
FIG. 2 is a diagram of the software elements involved in the accessing of data from a data embodying object in a dynamically linked library in accordance with principles of the present invention, and the software elements involved in the creation of a data embodying object by a code authoring utility when required due to changes in the data encapsulated by the object.

Referring now to FIG. 2, in accordance with principles of the present invention, an executable program 14 and library 16 that creates a control 10, utilizes a data embodying object 20' that has embodied therein data 28' for responding to queries from the control object 16.

The data embodying object 20' is, in one embodiment, a DLL which is not linked at compile time, and thus can be freely updated. (In alternate embodiments the data embodying object 20' may be linked when the application is compiled, although in such cases the object 20' is not updatable without recompiling the application 20'.)

Code for data object 20' is created by a code authority utility 28, which generates code to form methods and objects of the data embodying object 20'. The code comprises in large measure immediate value statements generated from a local or remote static data file 30 created by a data file editor 32 (such as a spreadsheet program, text editor or database program), or from reports generated by database server 24 from database 26, or via network service calls, or from a combination of these possibilities. It will be appreciated that the data may be embodied in an unencrypted form or may be stored in an encrypted form. In the event data is stored in an encrypted form it may be decrypted prior to being returned, or may be returned in an encrypted form for decrypting by the requesting control object 16. The code may further contain methods for acting upon the data before returning it. For example, methods could decrypt encrypted data, uppercase or lowercase the returned values, or return a summary value of all returned values or a subset of the data, or perform filtering or sorting.

Code authoring utility 28 is configured to generate embodied tables of data and then generate code therefor that become embodied within the library file that is retrieved to execute the data embodying object 20'.

Each time the data that is embodied in a data embodying object 20' must be updated, the code authoring utility 28 is executed. Utility 28 reads from the data source (such as a database 26 accessible through server 24 or a static file 30) to obtain the updated data, and using routines coded into a custom programmed method, generates a code file containing the desired data in immediate value statements, and logic for accessing the data and returning it upon execution of the code file. When using the C# Visual Studio .Net programming environment, this code file is a *.cs file, written to a preconfigured Visual Studio Solution folder. A Visual Studio Solution contains one or more related 'Projects', typically, each project will compile into its own dll. In the present case, the Solution contains one dll that is the data embodying object, and an Obfuscation Project (which does not create a dll). The Obfuscation project, which is an optional and applied if desired by the user, takes the data embodying object dll 20' and obfuscates it immediately after compilation.

A C# project can incorporate a 'key' that is used to sign a dll. The same key is used in the application 14. This key only allows applications compiled with the same key to access the dll. In the present case, such a key is used when creating the data embodying object dll 20'.

The compiled, signed and optionally obfuscated DLL is then ready to be included in the application. This is done by a DLL update process, such as the automatic updating process that can be implemented in the .NET programming environment. Notably, while all .NET DLL's may be updated by xcopy (i.e., they do not need to be registered and can be copied into the working folder), only those that are designed to be defined at runtime can be updated without also updating the application. In an embodiment of the present invention the data embodying object DLL is designed to be linked at runtime so that it may be updated without update of the main application by .NET xcopy.

The embodiment of the invention of FIG. 2 illustrates a control object 16 accessing a data embodying object 20' to obtain data for placement in a screen control 10. It will be appreciated, however, that the data embodying object 20' may be used for other purposes not tied to the creation of a screen control, and may be loaded by the application code itself for purposes other than display of information in a control.

For any given application, the data embodying object may or may not be a 'required' component. Software products utilizing a data embodying object may provide updates to a data embodying object as part of regular updating from the vendor's site, or alternatively, the software product may include an interface to a code authority utility 28 permitting the customer to compile data embodying objects with updated data as part of the use of the related software.

A number of code authoring utilities 28 are known to the art. For example, Microsoft's product known as CodeDom for the .NET framework is one example. Another code generating tool, known as CodeSmith, is described as "a full featured template-based code generation tool, using an ASP-.NET like syntax you can build and define a template which can be used to generate code". CodeDom and CodeSmith generate standard code through standardized templates or code libraries. While the present invention is similar in the auto-generation of code, the end result is a unique type of object in that it is data-embodying.

It will be appreciated that the process for updating data embodied in a data object of a library 20' involves the re-creation of the code for that data object, creating a substitute object in a replacement library 20". However, in the manner of other xcopy .net DLL updates, automated update services can be configured to automatically update the dll's and data embodied in data-embodying objects, as needed. The only known practical limit, which may not apply to all circumstances, is that compilers may have a limit on how big a file can be compiled, so the amount of data contained in one dll may have an upper limit.

In accordance with principles of the present invention the data that is embodied in a data embodying object may be selected to be relatively static data, such as tables of ZIP codes and/or state codes which do not change often. By selecting relatively static data such as ZIP/postal code data for use in data embodying objects, the need for updates can be minimized to the extent desired. However, updates may be performed on such data as often as any other program patches, and particularly in the .NET framework, such updates may be fairly frequent and particularly transparently to the user. Thus, the inventive concepts are therefore applicable to data which is relatively more dynamic such as contact information for clients and partners and the like.

Figure 1:
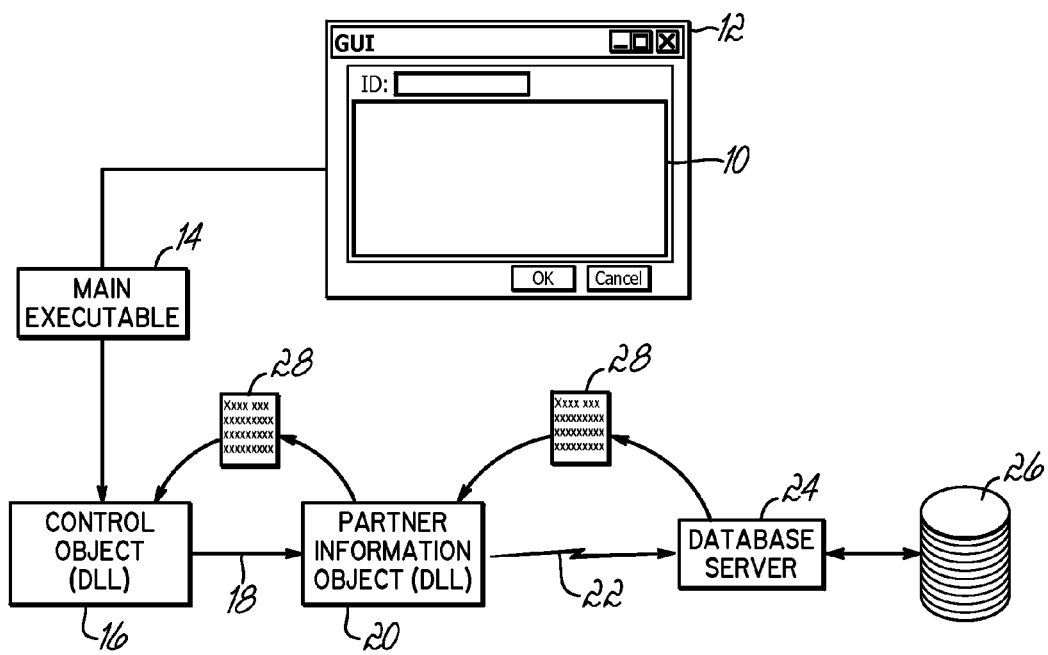
FIG. 1 is a diagram of the software elements involved in the accessing of data by a typical known application utilizing object oriented programming and dynamically linked libraries.

A program in accordance with principles of the present invention would typically include classes of the type heretofore used, including methods that act upon data as shown in FIG. 1, classes with embodied data as shown in FIG. 2, and typically multiple such classes of both types.

An illustration of the invention, for comparison with existing techniques, would be a program that has a need for a list of all city, state and zip codes in the US. This application could have a dll 20 called zipcodedata.dll containing a method called GetCityStateZip( ) Upon calling this method, the method would connect to the database 26, retrieve the data, format it, and return it to the calling program. Zipcodedata.dll may also incorporate a method called GetCityStateZip(string zipcode), which returns the single zip code data row corresponding to the string argument zip code passed to the method.

Alternatively, in accordance with principles of the present invention, this application would still have a dll (dynamically linked library) called zipcodedata.dll containing methods called GetCityStateZip( ) and GetCityStateZip(string zipcode). However, this dll would have 40,000+ rows of data embedded in the code thereof as immediate values, one for each city, state, zip combination. When the method GetCityStateZip( ) is called it returns an array built from the immediate values to the calling program. That is, upon calling this method, the method would retrieve the data already contained in the dll, format it, and return it to the calling program. Alternatively, when the method GetCityStateZip(string zipcode) is called, the method steps through several switch/case structures to locate the particular city/state/zip row matching the delivered zipcode argument.

In this example, the functionality to the calling program is the same under prior methods and using principles of the present invention. However, the program using prior methods needs to retrieve data from an external source, whereas the program using the invention already had the data contained stored within its class structure. Thus, the delay inherent in access from a remote source is avoided, and equally important, execution may proceed even where the remote source is unavailable.

In an implementation of the present invention, classes and methods compiled with the program are designed to call the dynamic dll's containing data. The methods retrieve the data, store it in memory in some cases, and add further functionality. In other words, a part of the method is compiled with the program and a part, containing the data, is in a library.

A sample class file with data has been attached, showing how a method adds a little over 1000 rows of insurance carrier information to an array and returns it to the calling program.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A program product incorporating a data embodying object for use in data retrieval of data found in a data source by an application program, comprising:
    a data embodying object comprising:
        method program code implementing at least one data retrieval method; and
        data program code incorporating immediate values accessible by a data retrieval method, the immediate values replicating data found in said data source;
        wherein the method program code causes return of immediate values found in said data program code upon the external invocation of said at least one data retrieval method without access to said data source; and
        wherein the immediate values of said data program code are compiled into said data program code and cannot be changed by operation of the data embodying object, and
    a non-transitory computer-readable media bearing said method program code and data program code.

2. The data embodying object of claim 1 wherein said data source is a database accessible via a database server.

3. The data embodying object of claim 1 wherein said data source is a spreadsheet file, text file, local database file and data accessible through a network service call.

4. The data embodying object of claim 1 wherein said object takes the form of a class having one or more methods returning data.

5. The data embodying object of claim 4 wherein said class is compiled into a library file.

6. The data embodying object of claim 4 wherein said class is added to an existing project and compiled into the executable file.

7. The data embodying object of claim 4 wherein the data in the class is persistent and immutable and is part of the class structure.

8. The data embodying object of claim 1 wherein said method program code and data program code are obfuscated.

9. The data embodying object of claim 1 wherein the immediate values in the data program code are encrypted.

10. The data embodying object of claim 1 wherein said method program code comprises access restriction code preventing access to confidential data in said data program code without authentication.

11. The data embodying object of claim 1 further comprising additional methods for one or more of: selecting data from said data program code, filtering data from said data program code, formatting data from said data program code, and searching data from said data program code.

12. A method of creating a data embodying object for use in data retrieval of data found in a data source by an application program, comprising:
    generating method program code implementing at least one data retrieval method; and
    generating data program code incorporating immediate values accessible by a data retrieval method, the immediate values being formed from data found in said data source;
    wherein the immediate values of said data program code are compiled into said data program code and cannot be changed by operation of the data embodying object, and
    wherein the method program code causes return of immediate values found in said data program code upon the external invocation of said at least one data retrieval method without access to said data source.

13. The method of claim 12 wherein said data program code is generated from data in said data source as a series of immediate value statements.

14. The method of claim 12 wherein said data source is a database accessible via a database server.

15. The method of claim 12 wherein said data source is one of a spreadsheet file, text file, local database file and data accessible through a network service call.

16. The method of claim 12 wherein said object takes the form of a class having one or more methods returning data.

17. The method of claim 16 wherein said class is compiled into a library file.

18. The method of claim 16 wherein said class is added to an existing project and compiled into the executable file.

19. The method of claim 16 wherein the class is persistent and immutable and is part of the class structure.

20. The method of claim 12 further comprising obfuscating said method program code and data program code.

21. The method of claim 12 further comprising encrypting the immediate values in the data program code.

22. The method of claim 12 wherein said method program code is generated with access restriction code preventing access to confidential data in said data program code without authentication.

23. The method of claim 12 further comprising generating data method program code implementing additional methods for one or more of: selecting data from said data program code, filtering data from said data program code, formatting data from said data program code, and searching data from said data program code.

* * * * *